US 9,816,296 B2

(12) United States Patent
Denny

(10) Patent No.: US 9,816,296 B2
(45) Date of Patent: Nov. 14, 2017

(54) CABLE LOCK ASSEMBLY

(71) Applicant: Katherine S. C. Denny, Kenilworth, IL (US)

(72) Inventor: Katherine S. C. Denny, Kenilworth, IL (US)

(*) Notice: Subject to any disclaimer, the term of this patent is extended or adjusted under 35 U.S.C. 154(b) by 0 days.

(21) Appl. No.: 15/164,641

(22) Filed: May 25, 2016

(65) Prior Publication Data
US 2016/0348403 A1 Dec. 1, 2016

Related U.S. Application Data

(60) Provisional application No. 62/168,432, filed on May 29, 2015.

(51) Int. Cl.
E05B 73/00 (2006.01)
E05B 37/02 (2006.01)
B62H 5/00 (2006.01)
E05B 67/00 (2006.01)
B62K 3/00 (2006.01)

(52) U.S. Cl.
CPC ......... *E05B 73/0005* (2013.01); *B62H 5/003* (2013.01); *E05B 37/02* (2013.01); *E05B 67/003* (2013.01); *E05B 73/0094* (2013.01); *B62K 3/002* (2013.01)

(58) Field of Classification Search
CPC ........ E05B 67/00; E05B 67/003; E05B 73/00; E05B 73/0005; E05B 73/0094
See application file for complete search history.

(56) References Cited

U.S. PATENT DOCUMENTS

| 4,212,175 | A | 7/1980 | Zakow |
| D267,470 | S | 1/1983 | Scherbing |
| 4,773,239 | A | 9/1988 | Lowe et al. |
| 4,970,882 | A | 11/1990 | Arrendondo |
| 4,971,345 | A | 11/1990 | Braun et al. |
| 5,065,603 | A | 11/1991 | Kloke |
| 5,095,722 | A * | 3/1992 | Chapmond ............ B60R 9/048 114/172 |
| D325,332 | S | 4/1992 | Oberhelman et al. |
| D332,043 | S | 12/1992 | Linhart |
| 5,179,847 | A | 1/1993 | Dorn |
| 5,622,066 | A | 4/1997 | Shallis |
| 5,628,214 | A | 5/1997 | Evers |
| D390,771 | S | 2/1998 | Egger |
| 5,802,889 | A | 9/1998 | Arnold |
| D418,040 | S | 12/1999 | Howard |
| 6,230,526 | B1 * | 5/2001 | Fontes ................. A63C 11/004 280/809 |
| D451,368 | S | 12/2001 | Hardesty |
| 6,428,075 | B2 | 8/2002 | Kamemizu et al. |

(Continued)

*Primary Examiner* — Christopher Boswell
(74) *Attorney, Agent, or Firm* — Senniger Powers LLP

(57) ABSTRACT

A cable lock assembly for securing an object to a securing structure. The cable lock assembly includes a flexible cable extending from a first end segment to a second end segment. A connecting portion of a collar is connected to the first end segment of the cable, and a flexible portion of the collar extends away from the connecting segment to a distal end. A lock is fixed to the collar. The flexible portion of the collar is movable relative to the flexible cable from an open position to a closed position to open and close the collar. The lock can lock the collar in the closed position around an object.

20 Claims, 4 Drawing Sheets

(56) References Cited

U.S. PATENT DOCUMENTS

| | | | | |
|---|---|---|---|---|
| 6,430,973 B1* | 8/2002 | Huang | ................... | B62H 5/003 |
| | | | | 70/18 |
| 6,457,762 B1* | 10/2002 | Garutti | ................ | A63C 11/006 |
| | | | | 224/257 |
| D474,100 S | 5/2003 | Zapushek | | |
| 6,993,942 B2* | 2/2006 | Boni | ...................... | A63C 11/02 |
| | | | | 70/14 |
| 7,131,298 B1 | 11/2006 | Haraughty | | |
| 7,784,313 B2* | 8/2010 | Wyers | ................... | E05B 67/003 |
| | | | | 70/14 |
| 8,196,945 B2 | 6/2012 | Hensley | | |
| 8,505,342 B1 | 8/2013 | Taiga | | |
| 8,534,754 B2 | 9/2013 | Livne | | |
| 8,756,960 B2 | 6/2014 | Poehlmann | | |
| 8,854,207 B2 | 10/2014 | Williams | | |
| 8,967,397 B1 | 3/2015 | Greenwald | | |
| 2001/0031588 A1* | 10/2001 | Young | ................... | E05B 73/007 |
| | | | | 441/74 |
| 2006/0032276 A1* | 2/2006 | Early | ................. | E05B 73/0005 |
| | | | | 70/58 |
| 2008/0072633 A1* | 3/2008 | Samuel | ................ | E05B 67/003 |
| | | | | 70/58 |
| 2013/0174616 A1* | 7/2013 | Allen, Jr. | .............. | E05B 37/025 |
| | | | | 70/30 |

* cited by examiner

CABLE LOCK ASSEMBLY

CROSS REFERENCE TO RELATED APPLICATION

The present application claims priority to U.S. Provisional Patent Application Ser. No. 62/168,432, filed May 29, 2015 and entitled CABLE LOCK ASSEMBLY, which is hereby incorporated by reference in its entirety.

FIELD OF THE DISCLOSURE

The present disclosure generally relates to locks, more particularly to a cable lock for securing a skateboard, scooter, bicycle, or other object.

BACKGROUND

Typical bicycle lock assemblies include long cables for looping around portions of the bicycle and portions of a securing structure (e.g., a bike rack) to secure the bicycle to the securing structure. These long cables are not useful in securing smaller items, such as a skateboard or a scooter, because the cables can easily be slipped off of the narrow components of the skateboard or scooter. Thus, skateboard or scooter users often forgo locking their objects, leaving them without any deterrent to theft.

SUMMARY

In one aspect, a cable lock assembly comprises a flexible cable having a first end segment and a second end segment spaced apart from the first end segment along a length of the flexible cable. At least one collar includes a connecting portion secured to the first end segment of the flexible cable and at least one flexible portion extending from the connecting portion to a distal end remote from the first end segment of the cable. The flexible portion of the collar is configured to be selectively flexed to move relative to the first end segment of the flexible cable between an open position in which the collar is open to allow passage of an object into and out of the collar and a closed position in which the collar forms a closed loop to prevent passage of the object into and out of the collar. A lock is fixed to the collar and includes a lock element at the distal end of the flexible portion configured to selectively lock the flexible portion of the collar to secure the flexible portion in the closed position to lock the cable lock assembly to the object.

In another aspect, a cable lock assembly comprises a flexible cable having a first end segment and a second end segment spaced apart from the first end segment along a length of the flexible cable and first and second T-joints. Each of the first and second T-joints have a base portion defining a base portion socket and first and second side portions extending outward from the respective base portion and defining first and second side portion sockets. The first end segment of the flexible cable is received in the base portion socket of the first T-joint and the second end segment of the flexible cable is received in the base portion socket of the second T joint. A first collar is secured to the first end segment of the flexible cable by the first T-joint and a second collar is secured to the second end segment of the flexible cable in the second T-joint. Each of the first and second collars includes a first flexible portion and a second flexible portion. The first flexible portion of each collar is received in the first side portion socket of the respective T-joint and extends from the T-joint to a distal end. And the second flexible portion of each collar is received in the second side portion socket of the respective T-joint and extends from the T-joint to a distal end. The first and second flexible portions of each of the first and second collars are movable relative to one another and the respective T-joint between an open position in which the distal ends thereof are spaced apart from one another to allow a respective object to pass into and out of the collar between the respective first and second flexible portions to a closed position in which the collar extends circumferentially around the respective object to prevent passage of the object into and out of the respective collar between the respective first and second flexible portions. A first lock is fixed to the first collar and configured to selectively lock the distal ends of the first and second flexible portions thereof in the closed position to lockingly secure the first collar to the first object. And a second lock fixed to the second collar and configured to selectively lock the end segments of the first and second flexible portions thereof in the closed position to lockingly secure the second collar to the respective object whereby the cable lock assembly can lockingly secure the respective objects to one another.

Other aspects and features will be apparent and/or pointed out hereinafter.

BRIEF DESCRIPTION OF THE DRAWINGS

Corresponding reference characters indicate corresponding parts throughout the drawings.

DETAILED DESCRIPTION

Figure 1:
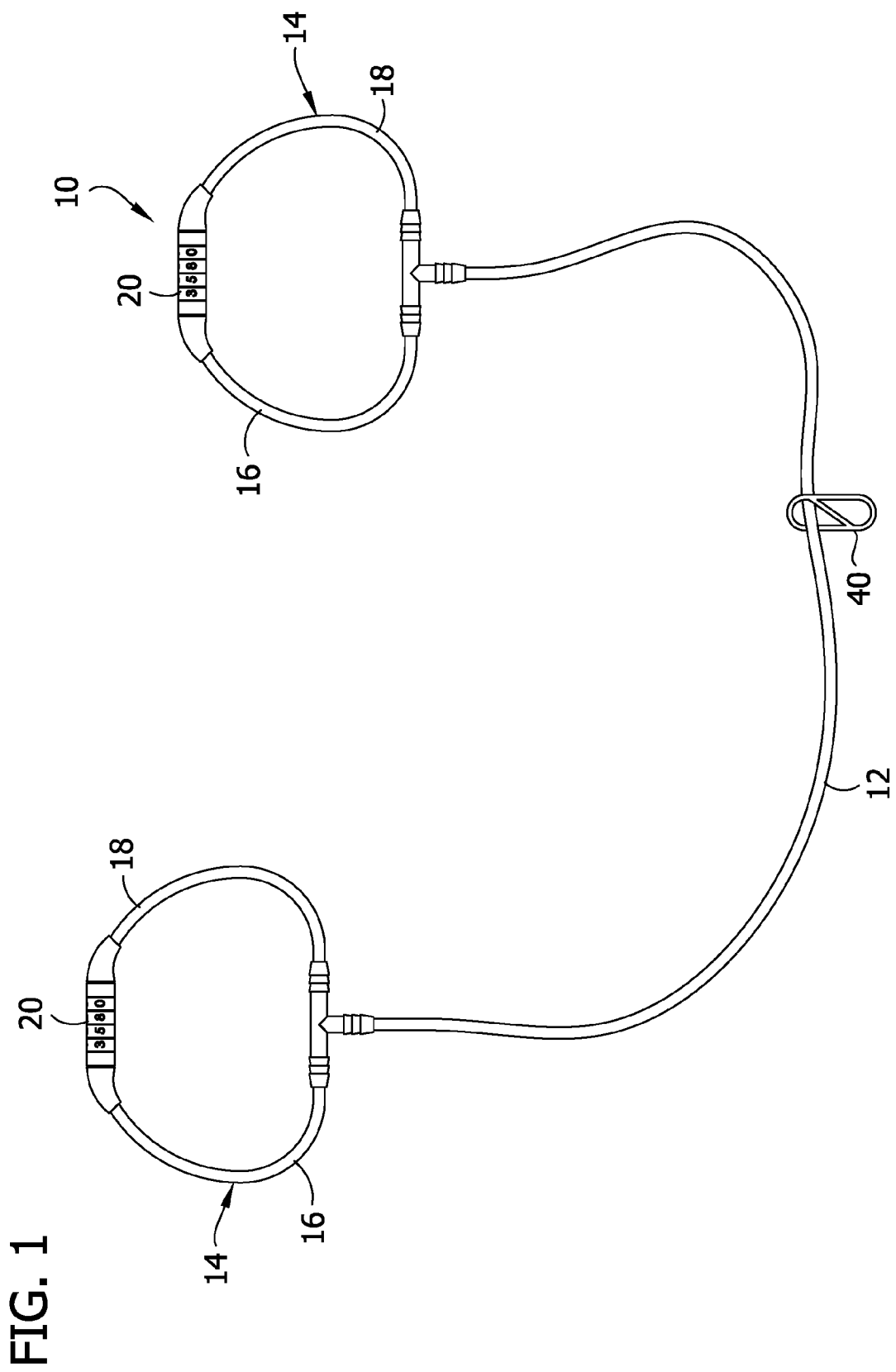
FIG. 1 is a schematic illustration of a cable lock assembly.

Referring to FIG. 1, a cable lock assembly is generally indicated at 10. The cable lock assembly 10 is configured to secure an object to a securing structure, examples of which will be described more fully hereinafter. The cable lock assembly 10 includes a flexible cable 12 and at least one loop or collar 14 extending from the flexible cable. The flexible cable 12 can be a straight cable, a spring cable, or any other suitable cable. The flexible cable 12 has a first end segment and a second end segment located on an opposite end of the cable. However, it will be understood that the first and second end segments can be spaced apart from the first end segment anywhere along a length of the cable 12. In one embodiment, the flexible cable has a length in a range of about 6 inches to about 36 inches, such as a length of 6 inches, 12 inches, 18 inches, 24 inches, 30 inches, 36 inches, or other suitable length. The flexible cable 12 can be any color (e.g., black, red, blue, green, etc.). Other configurations are within the scope of the present invention. For example, instead of the flexible cable 12, the cable lock assembly can include a chain, a bar, or other suitable structure.

The cable lock assembly 10 includes a least one collar 14 secured to the first end segment of the flexible cable at a connecting portion of the collar. In general, suitable collars 14 can include at least one flexible portion 16, 18 extending from the connecting portion to a distal end. Each flexible portion 16, 18 is suitably configured to be selectively flexed to move relative to the end segment of the flexible cable 12 between an open position in which the collar 14 is open to allow passage of an object into and out of the collar and a closed position in which the collar forms a closed loop to prevent passage of the object into and out of the collar. As explained below, the illustrated cable assembly 10 includes two collars 14, each secured to a respective one of the first and second end segments of the flexible cable 12, and each comprising first and second flexible portions 16, 18 extending from the connecting portion of the respective collar to a respective distal end. Other collars, such as collars with only one flexible portion extending from the end segment of the flexible cable, may also be used without departing from the scope of the invention.

Referring still to FIG. 1, each of the first and second flexible portions 16, 18 extends outward from the connecting portion of the collar 14 to a respective distal end. Suitably, the first and second flexible portions 16, 18 are both movable relative to the flexible cable 12 and to each other. In an exemplary embodiment, the collar 14 has a circular shape when the first and second flexible portions 16, 18 are moved to the closed position. In one or more embodiments, the connecting portion of the collar 14 and one or both of the first and second flexible portions 16, 18 comprise contiguous lengths of a single cable. In the illustrated embodiment, each of the first and second flexible portions 16, 18 and the connecting portion of the collar 14 are formed from a single cable. Other collar configurations are within the scope of the present invention, such as only one of the first and second portions being movable relative to the flexible cable (i.e., one of the portions is fixed), the first and/or the second portion being something other than a cable (e.g., a non-flexible portion such as a bar or another type of flexible portion such as a chain, etc.), and/or other shapes for the collar (e.g., D-shape).

The distal ends of the first and second flexible portions 16, 18 can be selectively attached to and released from each other by a lock 20. The first and second portions 16, 18 of the collar 14 are flexible cables having attachment structure (e.g., lock 20) on the distal ends for selective engagement and securement of the first and second portions relative to each other (e.g., to secure the collar in the closed position). The first and second flexible portions 16, 18 are movable relative to each other to selectively attach and secure the portions together. When the first and second flexible portions 16, 18 are attached and secured to each other by the lock 20, the collar 14 has a generally circular shape. In one embodiment, the lock 20 is a combination lock. A combination lock offers the advantage of not requiring a user to carry a key. The lock 20 may, for example, be a combination lock having 4 characters, although other configurations (e.g., 3 characters or any number of characters) are within the scope of the present invention. The characters of the combination lock can be numerical or alphabetical. Other configurations are within the scope of the present invention, such as a padlock or other locking or attachment structure for selectively attaching and securing the first and second portions of the collar to each other.

In the illustrated embodiment, a T-joint 22 secures the collar 14 to the end segment of the flexible cable 12. In other embodiments, the collar can be secured to the end segment of the flexible cable in other ways. The T-joint has a base portion 22A defining a base portion socket and first and second side portions 22B, 22C extending outward from the base portion and defining first and second side portion sockets. In suitable embodiments, a T-joint 22 may be used to secure each of the first and second collars 14 to the respective end segment of the flexible cable 12. At each T-joint 22, the first flexible portion 16, second flexible portion 18, and flexible cable 12 are each received in the T-joint sockets and thereby attached to each other. More specifically, the respective end segment of the flexible cable 12 is received in the base socket defined by the base portion 22A, the first flexible portion 16 of the collar 14 is received in the socket defined by the first side portion 22B, and the second flexible portion of the collar is received in the side socket defined by the second side portion 22C. In one or more embodiments, each of the three sockets in the T-joint 22 are open to one another so that the end segment of the cable 12 can be joined to the connecting segment of the collar 14 within the T-joint. Thus, in one or more embodiments, the segments of the first and second flexible portions 16, 18 of the collar 14 that are received in the sockets of the T-joint 22 form the "connecting portion" of the collar. Other configurations for connecting the collar 14 and the flexible cable 12 are within the scope of the present invention, such as the first and second portions being formed integrally with the flexible cable. In one embodiment (not shown), the ends of first portion and second portion and flexible cable are soldered together.

Figure 3:
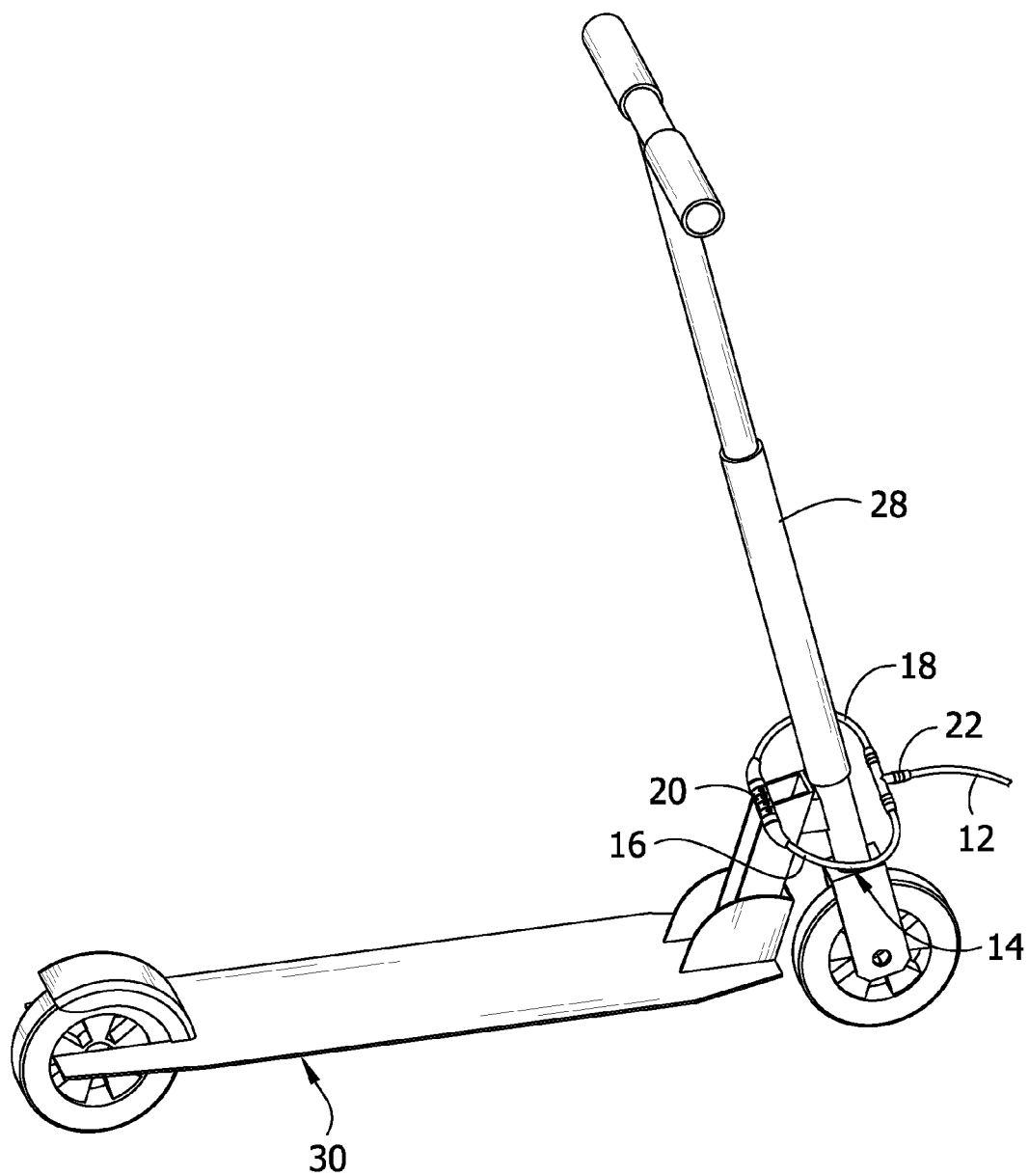
FIG. 3 is a perspective of a scooter showing a fragmentary portion of the cable lock assembly attached to a steering shaft of the scooter.
Figure 4:
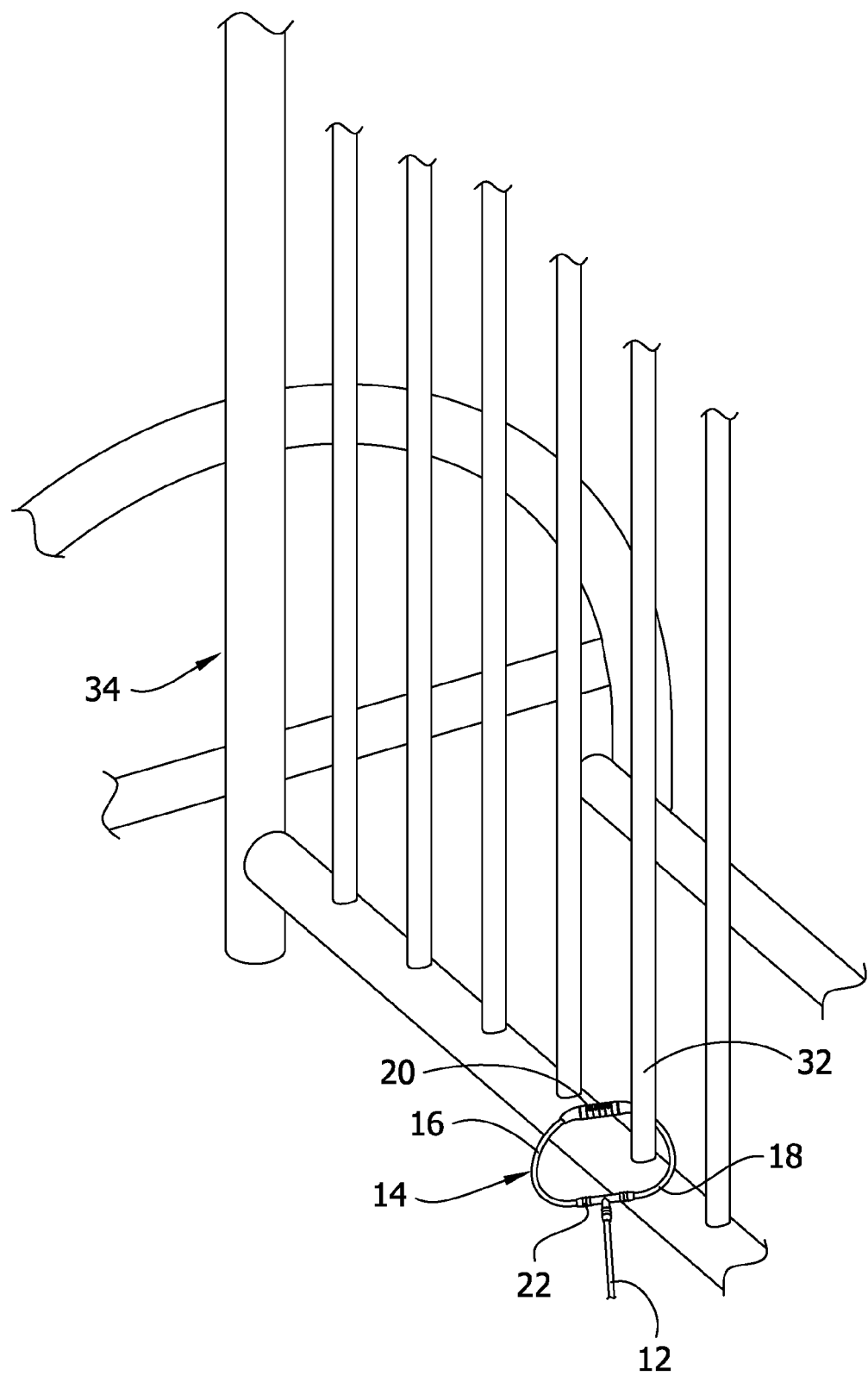
FIG. 4 is a fragmentary perspective of a bike rack and the cable assembly showing the collar of the cable lock assembly attached to a pole of the bike rack.

The collar 14 is configured for attachment to a component of an object to be secured by the cable lock assembly 10. The collar 14 defines a generally circular interior section for receiving the component. The collar 14 is configured for attachment to relatively narrow components, such as a truck 24 of a skateboard 26 (FIG. 2), a steering shaft 28 of a scooter 30 (FIG. 3), and/or a pole 32 of a bike rack 34 (FIG. 4). In one embodiment, a diameter of the generally circular interior section is in a range of about 6 inches to about 24 inches, such as about 6 inches, 8 inches, 10 inches, 12 inches, 14 inches, 16 inches, 18 inches, 20 inches, 22 inches, 24 inches, or any other suitable length. In one embodiment, the diameter of the generally circular interior section is in a range of about 6 inches to about 8 inches. The relatively small diameter of the collar 14, as compared to other locking devices such as a bicycle lock, permits the cable lock assembly 10 to secure items that would easily slip out of larger bicycle locks. The collar 14 can be configured for attachment to other items, such as patio furniture, barbeque grills, dog collars, outdoor displays, or other objects having relatively narrow components.

Figure 2:
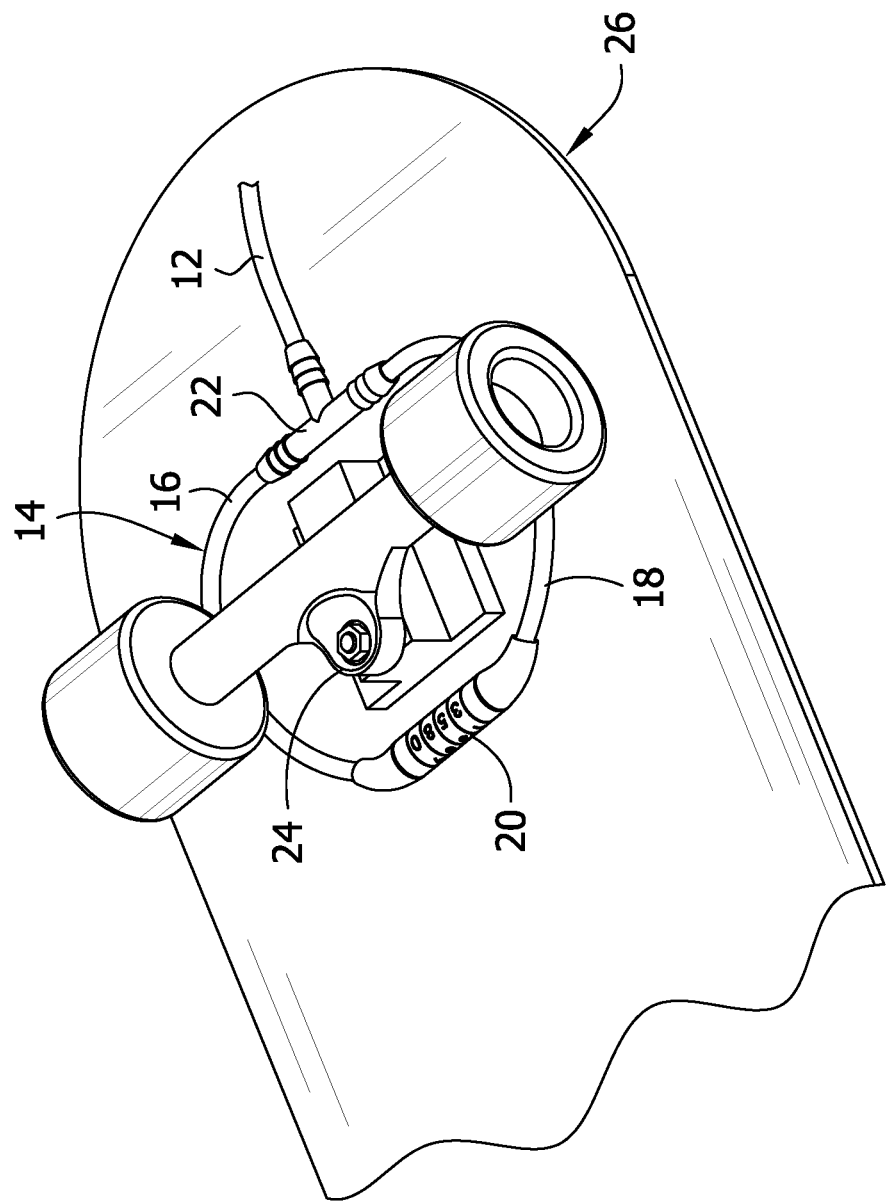
FIG. 2 is a bottom, fragmentary perspective of a skateboard and the cable lock assembly showing a collar of the cable lock assembly attached to a truck of a skateboard.

As seen in FIG. 2, the collar 14 is configured to be secured around the truck 24 of the skateboard 26. The collar 14 cannot be removed from the skateboard 26 unless the lock 20 is unlocked, the truck 24 is removed from the skateboard, or the collar is cut or broken. Thus, the collar 14 cannot easily be slipped off the skateboard 26 and the cable lock assembly 10 deters theft of the skateboard. As seen in FIG. 3, the collar is configured to be secured around a base of the steering shaft 28 of the scooter 30. The collar 14 cannot be removed from the scooter 30 unless the lock 20 is unlocked, the steering shaft 28 is removed from the scooter, or the collar is cut or broken. Thus, the collar 14 cannot easily be slipped off the scooter 30 and the cable lock assembly 10 deters theft of the scooter. As seen in FIG. 4, the collar 14 is also configured to be secured to a pole 32 of a bike rack 34. The collar 14 cannot be removed from the bike rack 34 unless the lock 20 is unlocked, the bike rack is broken, or the collar is cut or broken. Thus, the collar 14 provides secure attachment to a structure such as a bike rack.

Referring to FIG. 1, each collar 14 is attached to the flexible cable 12 in any suitable manner, such as by the T-joint 22 as described above (FIGS. 2-4). Having a collar 14 at each end of the flexible cable 12 permits simple attachment of the cable lock assembly 10 to both the object to be secured (e.g., skateboard, scooter, etc.) and the structure to which the object is secured (e.g., bike rack). Each collar 14 functions independently. The opposite ends of the flexible cable 12 do not need to interact with each other or come together in any way to use the cable lock assembly 10. One of the collars 14 can be secured to the object (e.g., to the skateboard as shown in FIG. 2 or to the scooter as shown in FIG. 3), and the other one of the collars can be secured to the structure (e.g., to the bike rack as shown in FIG. 4). The lock 20 on each collar can be programmed by the user to have the same combinations on both ends, or alternatively can be programmed to have different combinations on each end. Other configurations are within the scope of the present invention. For example, the cable lock assembly 10 can include only one collar 14 at one end thereof. In one embodiment, the other end of the cable lock assembly 10 can be integrally attached to or formed with the object to be secured (e.g., skateboard or scooter) or the securing structure (e.g., bike rack). In one embodiment, the other end of the cable lock assembly includes a loop through which the lock or collar is threaded to attach the cable lock assembly to an object. In one embodiment, the flexible cable 12 can be a retracting cable that is attached to or formed with the object to be secured or the securing structure.

Referring still to FIG. 1, the cable lock assembly 10 can include a clip 40 (broadly, an attaching mechanism) on the flexible cable 12. The clip 40 can be used to carry or store the cable lock assembly 10 when the cable lock assembly is not in use. For example, the cable lock assembly 10 can be clipped to a backpack, purse, other bag, or other carrying structure using the clip 40. Other configurations for easily carrying or storing the cable lock assembly are within the scope of the present invention. It is understood that the cable lock assembly need not include the clip 40.

The cable lock assembly 10 as described above permits quick and easy securement of an object having narrow components, such as a skateboard or scooter. The cable lock assembly 10 is relatively lightweight and is easy for a child to carry and use. The collar 14 of the cable lock assembly 10 is small enough to fit the narrow components that a typical bicycle lock would easily slip off of, to deter theft of objects a typical bicycle lock cannot protect.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable lock assembly comprising:
    a flexible cable having a first end segment and a second end segment spaced apart from the first end segment along a length of the flexible cable;
    a first collar including a first flexible portion having a first distal end and a second flexible portion having a second distal end, the first flexible portion secured to the first end segment of the flexible cable and extending from the first end segment of the flexible cable in a first direction to the first distal end, the second flexible portion secured to the first end segment of the flexible cable and extending from the first end segment of the flexible cable in a second direction different from the first direction to the second distal end, the first and second flexible portions being configured to be selectively flexed to move relative to one another and to the first end segment of the flexible cable between an open position in which the first collar is open and the first and second distal ends are spaced apart from one another to allow passage of an object into and out of the first collar and a closed position in which the first collar forms a closed loop and the first and second flexible portions extend around the object to prevent passage of the object into and out of the first collar;
    a lock fixed to the first collar and including a lock element adjacent at least one of the first and second distal ends for selectively locking together the first and second distal ends to secure the first collar in the closed position to lock the cable lock assembly to the object; and
    a second collar including a connecting portion secured to the second end segment of the flexible cable;
    wherein each of the first and second collars comprises a T-joint securing to the respective end segment of the flexible cable to the respective collar.

2. The cable lock assembly as recited in claim 1 wherein the first collar defines a first closed loop in the closed position and the second collar is configured to define a second closed loop in a closed position that is separate and spaced apart from the first closed loop.

3. The cable lock assembly as set forth in claim 2 wherein the second collar includes a flexible portion that is configured to be selectively flexed to move relative to the flexible cable.

4. The cable lock assembly as set forth in claim 3 further comprising another lock configured to selectively lock the flexible portion of the second collar to secure the flexible portion of the second collar in the closed position.

5. The cable lock assembly as set forth in claim 1 wherein each of the collars has a diameter in a range of about 6 inches to about 8 inches.

6. The cable lock assembly as set forth in claim 1 wherein the second collar includes a connecting portion and first and second flexible portions extending from the connecting portion to respective distal ends.

7. The cable lock assembly as set forth in claim 6 wherein the first and second flexible portions of the second collar and the second end segment of the flexible cable are received in respective end portions of the respective T-joint.

8. The cable lock assembly as set forth in claim 7 wherein the first and second flexible portions of the first collar and the first end segment of the flexible cable are received in respective end portions of the respective T-joint.

9. The cable lock assembly as set forth in claim 1 wherein the length of the flexible cable is in a range of about 6 inches to about 36 inches.

10. The cable lock assembly as set forth in claim 1 wherein the lock comprises a combination lock.

11. The cable lock assembly as set forth in claim 1 wherein the collar has a generally circular shape in the closed position.

12. The cable lock assembly as set forth in claim 1 wherein the connecting portion and the flexible portion of the collar comprise contiguous lengths of a single cable.

13. The cable lock assembly as set forth in claim 1 wherein the collar is sized and arranged for extending around and lockingly engaging a truck of a skateboard in the closed position.

14. The cable lock assembly as set forth in claim 1 wherein the collar is sized and arranged for extending around and lockingly engaging a steering shaft of a scooter in the closed position.

15. The cable lock assembly as set forth in claim 1 wherein the collar comprises another cable that is separately attached to the flexible cable.

16. The cable lock assembly as set forth in claim 1 further comprising an attaching mechanism connected to the flexible cable between the first and second end segments thereof.

17. The cable lock assembly set forth in claim 1 wherein the first and second flexible portions are joined to the first end segment of the flexible cable at a joint that is positioned diametrically opposite the lock with respect to the first collar when the first collar is in the closed position.

18. The cable lock assembly as set forth in claim 1 wherein the first and second flexible portions of the first collar and the first end segment of the flexible cable are received in respective end portions of the respective T-joint.

19. A cable lock assembly comprising:
a flexible cable having a first end segment and a second end segment spaced apart from the first end segment along a length of the flexible cable;
at least one collar including a first flexible portion having a first distal end and a second flexible portion having a second distal end, the first flexible portion secured to the first end segment of the flexible cable and extending from the first end segment of the flexible cable in a first direction to the first distal end, the second flexible portion secured to the first end segment of the flexible cable and extending from the first end segment of the flexible cable in a second direction different from the first direction to the second distal end, the first and second flexible portions being configured to be selectively flexed to move relative to one another and to the first end segment of the flexible cable between an open position in which the collar is open and the first and second distal ends are spaced apart from one another to allow passage of an object into and out of the collar and a closed position in which the collar forms a closed loop and the first and second flexible portions extend around the object to prevent passage of the object into and out of the collar; and
a lock fixed to the collar and including a lock element adjacent at least one of the first and second distal ends for selectively locking together the first and second distal ends to secure the collar in the closed position to lock the cable lock assembly to the object;
wherein the first and second flexible portions of the collar and the first end segment of the flexible cable are received in respective end portions of the T-joint.

20. A cable lock assembly comprising:
a flexible cable having a first end segment and a second end segment spaced apart from the first end segment along a length of the flexible cable;
first and second T-joints, each of the first and second T-joints having a base portion defining a base portion socket and first and second side portions extending outward from the respective base portion and defining first and second side portion sockets, the first end segment of the flexible cable being received in the base portion socket of the first T-joint and the second end segment of the flexible cable being received in the base portion socket of the second T joint;
a first collar secured to the first end segment of the flexible cable by the first T-joint and a second collar secured to the second end segment of the flexible cable in the second T-joint, each of the first and second collars including a first flexible portion and a second flexible portion, the first flexible portion of each collar being received in the first side portion socket of the respective T-joint and extending from the T-joint to a distal end, and the second flexible portion of each collar being received in the second side portion socket of the respective T-joint and extending from the T-joint to a distal end, the first and second flexible portions of each of the first and second collars being movable relative to one another and the respective T-joint between an open position in which the distal end thereof are spaced apart from one another to allow a respective object to pass into and out of the collar between the respective first and second flexible portions to a closed position in which the collar extends circumferentially around the respective object to prevent passage of the object into and out of the respective collar between the respective first and second flexible portions;
a first lock fixed to the first collar and configured to selectively lock the distal ends of the first and second flexible portions thereof in the closed position to lockingly secure the first collar to the first object and a second lock fixed to the second collar and configured to selectively lock the end segments of the first and second flexible portions thereof in the closed position to lockingly secure the second collar to the respective object whereby the cable lock assembly can lockingly secure the respective objects to one another.

* * * * *